(12) United States Patent
Paquette

(10) Patent No.: US 9,918,460 B2
(45) Date of Patent: Mar. 20, 2018

(54) FISHING BAIT HOLDER

(71) Applicant: Jean-Robert Paquette, Hanmer (CA)

(72) Inventor: Jean-Robert Paquette, Hanmer (CA)

( * ) Notice: Subject to any disclaimer, the term of this patent is extended or adjusted under 35 U.S.C. 154(b) by 0 days.

(21) Appl. No.: 14/562,174

(22) Filed: Dec. 5, 2014

(65) Prior Publication Data
US 2015/0157002 A1    Jun. 11, 2015

Related U.S. Application Data

(60) Provisional application No. 61/912,309, filed on Dec. 5, 2013.

(51) Int. Cl.
    *A01K 97/05*      (2006.01)

(52) U.S. Cl.
    CPC ..................... *A01K 97/05* (2013.01)

(58) Field of Classification Search
    CPC ................. A01K 97/05; A01K 97/04
    USPC .................................. 43/56, 57, 55
    See application file for complete search history.

(56) References Cited

U.S. PATENT DOCUMENTS

| | | | | |
|---|---|---|---|---|
| 299,690 A | * | 6/1884 | Sherwood | A01K 97/05 43/56 |
| 302,086 A | * | 7/1884 | Barton | A01K 97/05 43/56 |
| 531,112 A | * | 12/1894 | Gilmore | A01K 97/05 43/56 |
| 553,456 A | * | 1/1896 | Ferris | A01K 97/05 43/56 |
| 647,257 A | * | 4/1900 | Gray | A01K 97/05 43/57 |
| 668,507 A | * | 2/1901 | Fisk | A01K 97/05 43/57 |
| 713,890 A | * | 11/1902 | Koch | A01K 97/05 43/56 |
| 769,874 A | * | 9/1904 | Paar | A01K 97/05 43/56 |
| 859,617 A | * | 7/1907 | Rimmelin | A01K 97/05 43/56 |

(Continued)

FOREIGN PATENT DOCUMENTS

| | | | |
|---|---|---|---|
| CA | 1201291 A1 | 3/1986 | |
| CA | 2316561 A1 | * 2/2002 | ............. A01K 97/05 |

(Continued)

OTHER PUBLICATIONS

Office Action for co-pending Canadian Application No. 2873480 mailed Oct. 26, 2015.

(Continued)

*Primary Examiner* — Darren W Ark
(74) *Attorney, Agent, or Firm* — James P. Muraff; Neal, Gerber & Eisenberg LLP

(57) ABSTRACT

A fishing bait holder includes an outer wall and a base defining a bait holding space having a bait opening for receiving bait to be held, the base comprising a porous base member configured to allow water to pass through the porous base member while not allowing the bait to pass through the porous base member. The fishing bait holder includes a bait lifter for fitting inside the bait holding space, the bait lifter configured to allow a user to lift the bait within the bait holding space, thereby facilitating the user's access to the bait.

9 Claims, 7 Drawing Sheets

(56) References Cited

U.S. PATENT DOCUMENTS

| | | | | |
|---|---|---|---|---|
| 965,662 | A * | 7/1910 | Sonke | A01K 97/05 43/56 |
| 1,110,892 | A * | 9/1914 | Cather | A01K 97/05 43/56 |
| 1,127,522 | A * | 2/1915 | Rowe | A01K 97/05 43/56 |
| 1,745,012 | A * | 1/1930 | Gilmore | A01K 97/05 43/56 |
| 2,093,132 | A * | 9/1937 | Logan | A01K 97/05 43/56 |
| 2,294,136 | A * | 8/1942 | Smith | A01K 97/05 43/56 |
| 2,318,842 | A * | 5/1943 | Eaton | B65D 83/005 43/56 |
| 2,408,306 | A * | 9/1946 | Flournoy | A01K 63/042 43/57 |
| 2,474,745 | A * | 6/1949 | Lewis | A01K 97/05 43/56 |
| 2,489,710 | A * | 11/1949 | Janisch | A01K 97/05 43/56 |
| 2,503,276 | A * | 4/1950 | Kranitz | A01K 97/05 43/55 |
| 2,531,628 | A * | 11/1950 | Janisch | A01K 97/05 43/56 |
| 2,560,672 | A * | 7/1951 | Volenec | A01K 97/05 43/57 |
| 2,600,826 | A * | 6/1952 | Allen | A01K 97/05 43/56 |
| 2,663,115 | A * | 12/1953 | McKissack | A01K 97/05 43/56 |
| 2,720,049 | A * | 10/1955 | Basky | A01K 97/05 43/56 |
| 2,731,760 | A * | 1/1956 | Ebert | A01K 97/05 43/57 |
| 2,738,613 | A | 3/1956 | Styer | |
| 3,000,132 | A * | 9/1961 | Koistinen | A01K 97/05 43/56 |
| 3,002,312 | A * | 10/1961 | Barker | A01K 97/05 43/56 |
| 3,039,225 | A * | 6/1962 | Semelka | A01K 97/05 43/56 |
| 3,196,576 | A | 7/1965 | Thomas, Sr. | |
| 3,236,001 | A * | 2/1966 | Keiter | A01K 97/04 43/55 |
| 3,452,469 | A * | 7/1969 | White | A01K 97/04 43/55 |
| 3,726,039 | A * | 4/1973 | Borrelli | A01K 97/05 43/56 |
| 3,955,306 | A * | 5/1976 | Handa | A01K 97/05 43/56 |
| 4,030,227 | A * | 6/1977 | Oftedahl | A01K 97/05 43/56 |
| 4,096,657 | A * | 6/1978 | Morrow | A01K 97/05 43/56 |
| 4,255,360 | A | 3/1981 | Jeffries | |
| 4,353,182 | A * | 10/1982 | Junkas | A01K 97/06 43/55 |
| 4,502,240 | A | 3/1985 | Kapucinski | |
| 4,513,525 | A * | 4/1985 | Ward | A01K 97/05 43/56 |
| 4,627,189 | A * | 12/1986 | Pippin | A01K 97/05 43/55 |
| 4,642,934 | A | 2/1987 | Carlson | |
| 4,686,788 | A * | 8/1987 | Hartman | A01K 97/05 43/56 |
| 4,790,964 | A | 12/1988 | Swanson | |
| 4,864,769 | A * | 9/1989 | Sandahl | A01K 97/05 43/56 |
| 4,994,177 | A | 2/1991 | Bogar, Jr. | |
| 5,077,932 | A * | 1/1992 | Hetherington | A01K 97/05 43/57 |
| 5,109,625 | A * | 5/1992 | Skrede | A01K 97/05 43/56 |
| 5,123,198 | A * | 6/1992 | Von Grossmann | A01K 97/05 43/56 |
| 5,165,198 | A * | 11/1992 | Kilian, III | A01K 97/05 43/55 |
| 5,481,823 | A * | 1/1996 | Hoover | A01K 97/04 43/55 |
| 5,507,113 | A * | 4/1996 | Keller | A01K 97/05 43/55 |
| 5,556,069 | A * | 9/1996 | Malmberg | A01K 97/05 43/56 |
| 5,634,291 | A * | 6/1997 | Pham | A01K 97/05 43/56 |
| 6,442,888 | B1 | 9/2002 | Morrow | |
| 6,857,222 | B1 * | 2/2005 | King | A01K 97/05 43/56 |
| 6,886,291 | B1 * | 5/2005 | Jaggers | A01K 97/05 43/56 |
| 7,299,585 | B2 * | 11/2007 | Perttu | A01K 97/05 43/56 |
| 7,644,535 | B2 * | 1/2010 | Sloop | A01K 97/05 43/56 |
| 8,615,921 | B1 * | 12/2013 | Weems | A01K 97/05 43/56 |
| 8,832,993 | B1 * | 9/2014 | Emmons, Sr. | A01K 97/05 43/56 |
| 9,101,123 | B2 * | 8/2015 | Schaefbauer | A01K 97/05 |
| 9,615,563 | B2 * | 4/2017 | Fontaine | A01K 97/04 |
| 9,814,225 | B2 | 11/2017 | Myers | |
| 2002/0020104 | A1 * | 2/2002 | Kolar | A01K 97/05 43/55 |
| 2005/0086851 | A1 * | 4/2005 | Carden | A01K 97/05 43/56 |
| 2006/0016119 | A1 * | 1/2006 | Ashburn | A01K 97/05 43/56 |
| 2008/0190011 | A1 * | 8/2008 | Neal | A01K 97/05 43/56 |
| 2008/0250697 | A1 * | 10/2008 | Wasnick | A01K 97/05 43/56 |
| 2009/0025271 | A1 * | 1/2009 | Duckworth | A01K 97/05 43/55 |
| 2014/0165451 | A1 * | 6/2014 | Scheibmeir | A01K 97/05 43/57 |
| 2014/0345187 | A1 * | 11/2014 | Fontaine | A01K 97/04 43/55 |
| 2016/0081319 | A1 * | 3/2016 | Myers | A01K 97/05 43/56 |

FOREIGN PATENT DOCUMENTS

| | | | | |
|---|---|---|---|---|
| CA | 2471644 A1 * | 9/2005 | | A01K 97/05 |
| CA | 2456277 C * | 6/2006 | | A01K 97/05 |
| CA | 2873480 C | 9/2016 | | |
| JP | 05056735 A * | 3/1993 | | |
| JP | 10215746 A * | 8/1998 | | |
| JP | 10323151 A * | 12/1998 | | |

OTHER PUBLICATIONS

Complaint for Declaratory Judgment.
Exhibit to Complaint~Claim details for Canadian Patent 2873480.
Exhibit to Complaint~Claims as Allowed for U.S. Appl. No. 14/562,174.
Exhibit to Complaint~Examinees Amendment for U.S. Appl. No. 14/562,174 (20 pages).

* cited by examiner

FISHING BAIT HOLDER

CROSS-REFERENCE TO RELATED APPLICATIONS

The present application claims priority from U.S. Provisional Patent Application 61/912,309 entitled "Fishing Bait Holder" filed Dec. 5, 2013 which is hereby incorporated by reference in its entirety for all purposes.

TECHNICAL FIELD

The present invention generally relates to fishing bait holders, and more particularly to fishing bait holders having a bait lifter therein for facilitating a user's access to held bait.

BACKGROUND

Many fishing techniques employ the use of natural bait, such as living or dead animals including minnows, worms, leeches, shrimp, crawfish or any other bait. A number of containers or holders for natural fishing bait are known, many of which generally involve some form of container that is capable of holding fishing bait within as well as for holding water within in some cases, all for use in containing and transporting bait. Some known containers involve insulating means for maintaining held bait at or near a target temperature, in order to maintain bait freshness.

Among the problems encountered with bait holders known in the art is that users are required to place their fingers or some other means into the water in which the bait is held in order to remove individual animals or pieces of bait before use. This process can be cold, unsanitary, unpleasant for users that have an aversion to water in which bait has been held, and potentially wasteful in circumstances where the water becomes cloudy or discoloured and thus some pieces of bait may be missed and eventually lost by the user. Additionally, some of these containers have a fairly large volume of space which makes it difficult to capture the bait (either with hands or with an apparatus).

An additional problem encountered with known bait holders is that water in such holders, in which the bait is held, may eventually become stale with the passage of time. Such stale water may be lacking in oxygen, may be contaminated with waste, and may deviate from a target temperature. In some cases, the staleness of the water may result in the undesired death of bait animals before use. Additionally, the staleness of the water may act to increase the unpleasant or unsanitary nature of removing the bait therefrom by a user.

A further additional problem encountered with known fishing bait holders is difficulty encountered by users when attempting to gain access to held bait with only one hand. Live bait animals have a tendency to squirm or swim away from the user's hand, or, in the case of bait such as crawfish, to bite or pinch, and potentially injure the user. Further, the use of any tools to attempt to isolate or "catch" the held bait is made difficult during one-handed operation, for example while the user's other hand operates a fishing boat or other fishing equipment such as a fishing rod or pole.

Yet an additional problem encountered with known fishing bait holders is that they may be unstable and prone to falling over and spilling their contents. This may be particularly problematic in circumstances where the bait holders are subject to physical instability, for example on board a fishing boat.

Yet another problem is that a large bait container for sharing bait between two fishermen fishing from the same boat may be awkward to access for both fishermen.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An inventive aspect of the disclosure is a fishing bait holder comprising an outer wall and a base defining a bait holding space having a bait opening for receiving bait to be held, the base comprising a porous base member configured to allow water to pass through the porous base member while not allowing the bait to pass through the porous base member, and a bait lifter for fitting inside the bait holding space, the bait lifter configured to allow a user to lift the bait within the bait holding space, thereby facilitating the user's access to the bait.

Another inventive aspect of the disclosure is a fishing bait holder that includes a container having an outer wall and a porous base plate together defining a bait-holding space inside the container, an upper end of the container defining a bait opening for receiving bait to be held, the base plate comprising one or more holes to allow water to pass through the holes in the base plate while blocking the bait from passing through the holes of the base plate. The holder also includes a bait-lifting scoop dimensioned to fit inside the bait holding space of the container, the bait-lifting scoop movable upwards relative to the outer wall to lift the bait within the bait holding space to thereby facilitate access to the bait.

DETAILED DESCRIPTION OF THE EMBODIMENTS

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
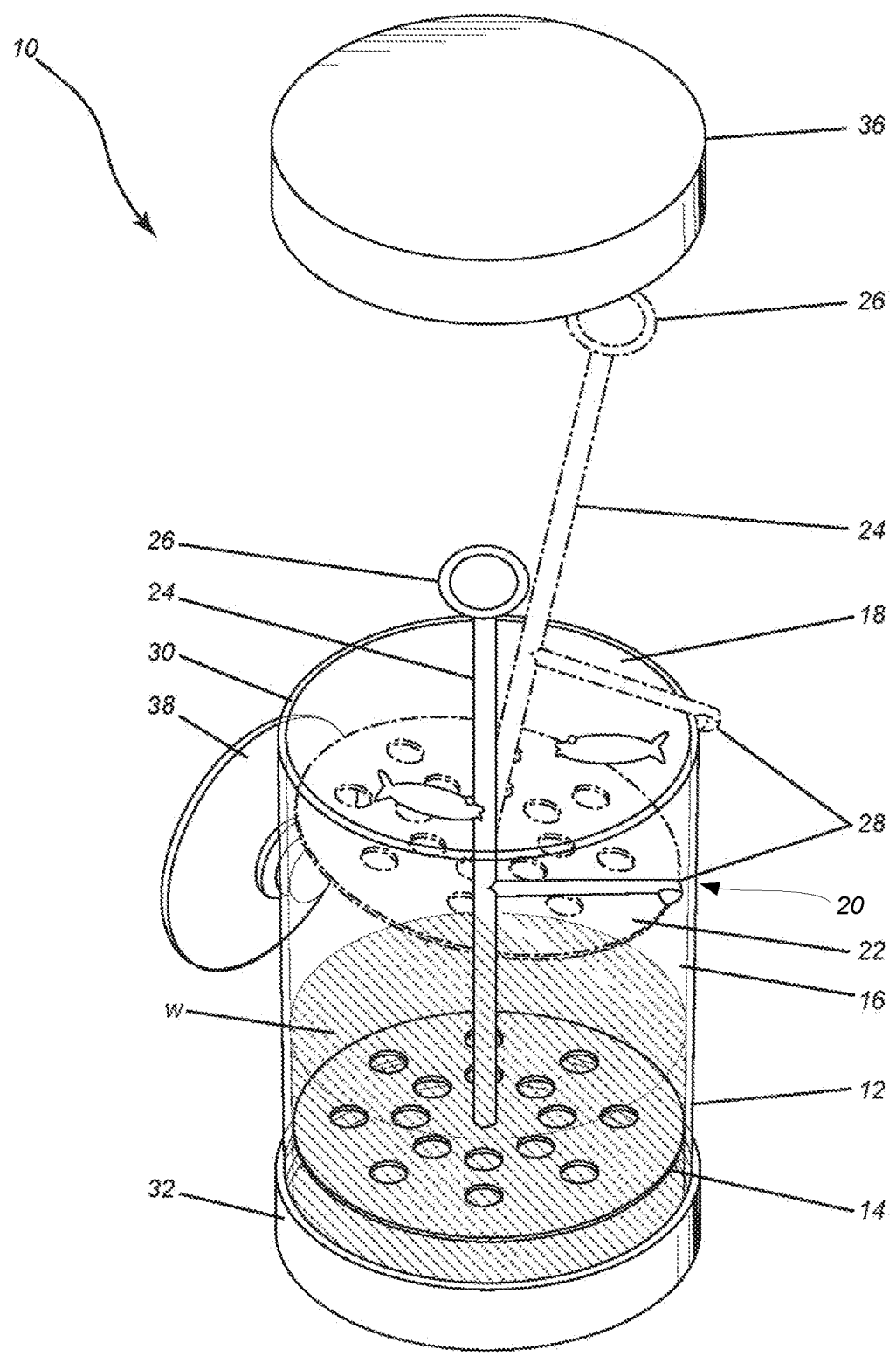
FIG. 1 is a perspective view of a fishing bait holder in accordance with an embodiment of the present invention.

FIG. 1 depicts a fishing bait holder 10 according to one embodiment of the present invention. An outer wall 12, and a base, which includes a porous base member 14, collectively define a bait holding space 16 having a bait opening 18 for receiving bait B to be held. In some embodiments, the bait opening 18 may also be used for receiving water W for use as a medium for containing the bait B within the bait holding space 16. In the embodiment depicted in FIG. 1, the outer wall 12 and the porous base member 14 define a cylindrical bait holding space 16 having a circular bait opening 18. In other embodiments, not shown, the outer wall 12 and the porous base member 14 may define a bait holding space 16 having other suitable shapes, for example that of a rectangular prism, and the bait opening 18 may also take other shapes, for example that of a rectangle or square.

In some embodiments, the fishing bait holder 10 is made wholly of plastic materials, but a variety of other suitable materials, including rubber, metal, wood, or glass, may be used for manufacture of some or all of the components of the fishing bait holder 10.

Porous base member 14 is configured to allow water W to pass therethrough while not allowing bait B to pass therethrough. In the embodiment depicted, the bait B to be held is minnows, and the pores in the porous base member 14 are small holes that are sized accordingly to prevent the passage of minnows therethrough. In other embodiments, the porous base member 14 may comprise a sieve, or could comprise pores, holes or apertures having any appropriate diameter or shape, which diameter and shape may vary according to the form of bait B to be held. In one embodiment, the pores, holes or apertures all have the same size and shape and are equally spaced in the base member although in other embodiments, the pores, holes or apertures may not all be of the same size and shape and/or may be spaced irregularly on the base member. Other forms of bait B to be held by the present fishing bait holder 10 to be held include worms, shrimp, leeches and crawfish.

A bait lifter 20, suitably configured for fitting inside the bait holding space 16, is configured to allow a user to lift the bait B within the bait holding space 16 and out of the water W, thereby facilitating the user's access to the bait B. In the embodiments depicted in FIGS. 1 and 2, the bait lifter 20 is porous and configured to act as a strainer, and in use, a user effectively strains the bait B from the water W in which it is held. In other embodiments, the bait lifter may be otherwise configured, for example as a flat plate which may be porous or nonporous.

Figure 2:
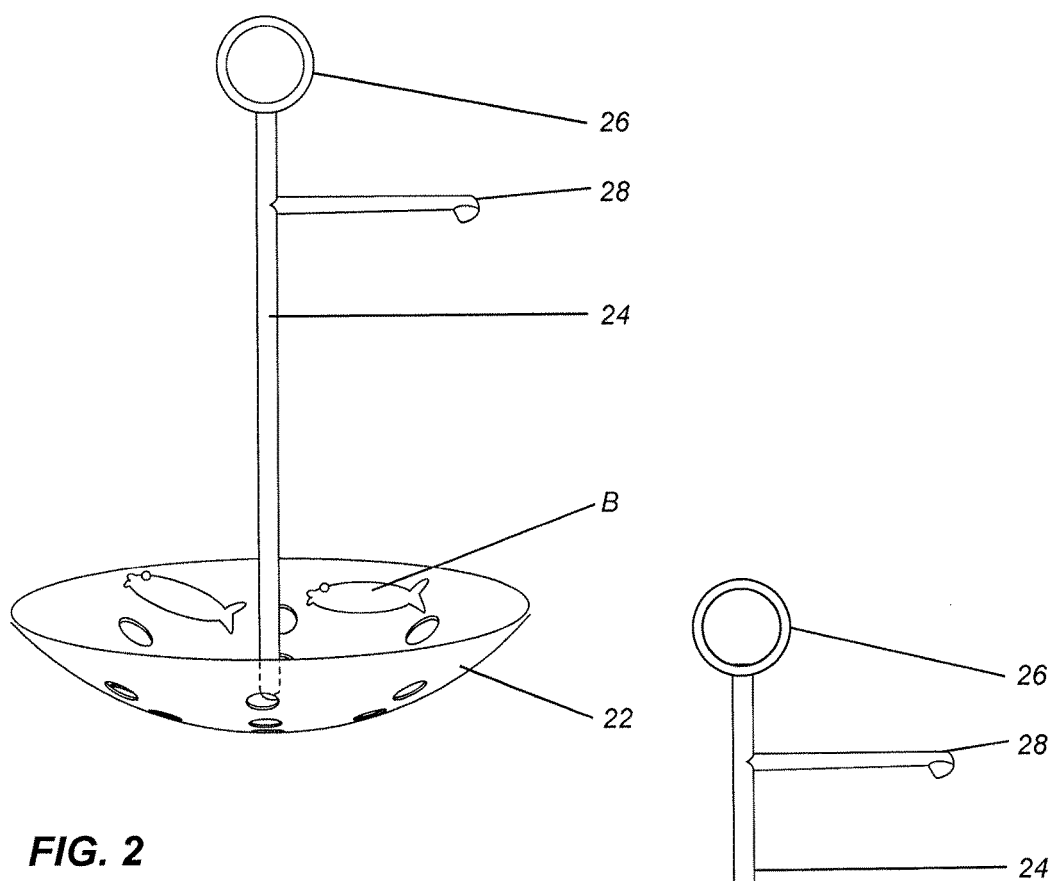
FIG. 2 is a perspective view of a bait lifter component, having a strainer member defining a concave, hemispherical bait-straining space, of a fishing bait holder in accordance with an embodiment of the present invention.
Figure 3:
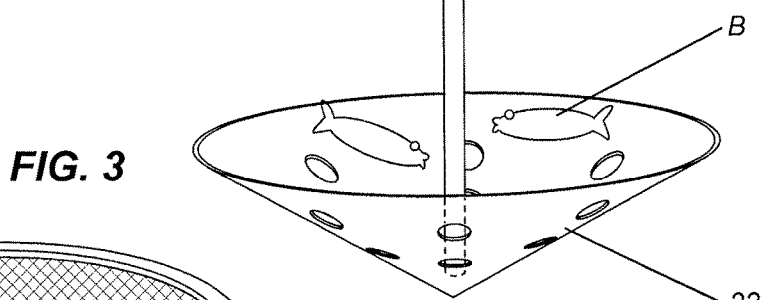
FIG. 3 is a perspective view of a bait lifter component, having a strainer member defining a conical bait straining space, of a fishing bait holder in accordance with an embodiment of the present invention.

In the embodiments depicted in FIGS. 1 and 2, the bait lifter 20 is made of a strainer member 22, which is appropriately configured to allow water to pass therethrough while not allowing bait to pass therethrough, to which a handle is attached. In the embodiment depicted, the handle includes a lifting knob 26 coupled to a lifting rod 24, which is attached to a strainer member 22. As shown in FIG. 3, the strainer member 22 may define a conically shaped straining space, in order to facilitate gathering of bait to be lifted. In other embodiments, the strainer member 22 may define other suitable shapes, including concave or hemispherical shapes, as shown in FIG. 2. The strainer member 22 may also define a flat plate, which may be porous, as depicted in FIG. 1. In some embodiments, the strainer member 22 is configured to fit within the bait holding space 16 such that bait B cannot pass between the strainer member 22 and the outer wall 12. In certain embodiments, the strainer member 22 or the bait lifter 20 itself may comprise a flexible resilient member, for example a ring member which may comprise a mesh material, disposed about the outer rim of the strainer member 22, to further prevent the passage of bait B between the outer wall 12 and the strainer member 22, thereby reducing the probability that bait B will become trapped or damaged between the strainer member 22 and the porous base member 14, which is of particular potential concern in embodiments where the strainer member 22 comprises a flat plate, as shown by way of example in FIG. 1.

In the embodiments depicted in FIGS. 1 and 2, the bait lifter 20 further includes a resting member 28 for resting on a portion of the fishing bait holder 10, for example on the inner surface of the outer wall 12, or on the lip 30 of the bait opening 18, thereby allowing a user to maintain the bait lifter 20 in a lifted position. In use, a user grasps the handle, lifts the bait lifter 20, thereby lifting bait B from the water W in which it is held, and may, by use of the resting member 28, rest the bait lifter 20 on the lip 30 of the bait opening 18 while having facilitated access to the bait B. The resting member 28 may be of particular assistance to users in applications where one-handed operation of the bait lifter 20 is required, overcoming one drawback of fishing buckets such as that taught by Canadian Patent 1,201,291 to Ward et al. For example, in use a user may be operating a fishing boat or fishing line with one hand, while using a free hand to grasp the bait lifter 20 by the handle. The user may then lift the bait lifter 20, removing bait B from the water W, maintain the bait lifter 20 in place by placement of the resting member 28 on the lip 30 of the bait opening 18, and may then easily remove bait animals one at a time from the bait holding space 16. In the embodiments depicted in FIGS. 1 and 2, the rest member is hook shaped, but other possible resting means, including numerous physical configurations or other means of removable attachment of the bait lifter 20 to the outer wall 12 or lip 30, are possible.

The porous base member 14 allows for facilitated refreshment of water W in which the bait B is held. For example, in certain embodiments, the fishing bait holder 10 may be placed in a body of water, for example a small puddle, a lake, a stream, an ocean, or in a pool of contained or circulating water in a storage facility, for example in a bait shop, such that water freely moves in and out of the bait holding space 16 through the porous base member 16, thus refreshing the water W in which the bait B is held. In certain embodiments, the bait opening 18 may be covered by a lid 36, in order to prevent bait B from escaping into the surrounding water during such use. Another means of refreshing the water is to remove the bottom lid to allow the water to flow out. The user may then re-attach the bottom lid and pour in fresh water from the top opening.

In circumstances where the water depth is appropriately shallow, or where the bait opening 18 is maintained above the water line in some manner, for example by attaching the fishing bait holder to a substrate such as a boat or dock by means of an attachment means 38, the problem of bait escape may be circumvented without need for covering the bait opening with a lid 36 or otherwise. Such attachment means 38 may include or be one, two, or more suction cups, as shown in the embodiment depicted in FIG. 1, or may be adhesive, Velcro™, clips, or other suitable means for temporarily or permanently attaching the fishing bait holder 10 to a substrate. In another embodiment, the attachment means may be a two-piece attachment means that includes a base mounted to a boat or other substrate for detachably mating with a detachable connector secured to the bait holder 1. Multiple bases may be mounted to the boat or other substrate for detachably receiving the bait holder 10: The substrate may be a boat, dock, or structure such as a portable chair or a seat within a fishing boat. Attaching the fishing bait holder 10 to such a substrate may be desirable in applications where one-handed operation is required, or in circumstances of physical instability, for example in a rocking or moving boat, which may otherwise result in bait spillage or tossing and rolling of the fishing bait holder 10 about the boat.

In some embodiments, where the bait opening 18 is circular, the lid 36 may be configured for threaded engagement with the outer wall 12. In other embodiments (not shown), other means of removable attachment of the lid 36 to the fishing bait holder 10, for example by friction fit, clips, or other suitable arrangement, may be employed.

In the embodiment shown in FIG. 1, a base cap 32 is depicted, for preventing water from passing to or from the bait holding space 16 through the base. In use, the base cap 32 may be placed over the base of the fishing bait holder 10 when use of the fishing bait holder 10 completely outside of water is desired. For example, when a user has finished fishing for the day, or is moving from one body of water to the next, the user may place the base cap 32 on the fishing bait holder 10, thereby closing the base, add water W to the bait holding space 16, and freely move the fishing bait holder 10 away from the body of water without risk of the held bait B becoming dry. In such applications, a user may then wish to place the lid 36 in place, thereby preventing accidental spillage of the contents of the fishing bait holder 10 during transport, preventing pillaging of the bait contents by predators such as raccoons or pelicans, invasion of the contents by pests such as flies or other insects, and reducing undesirable heating or cooling of such contents during transport and/or storage.

In some embodiments, where the base is circular, the base cap 32 may be configured for threaded engagement with the outer wall 12. In other embodiments, as with the lid 36, other means of removable attachment of the base cap 32 to the fishing bait holder 10, for example by friction fit, clips, or other suitable arrangement, may be employed.

Figure 4:
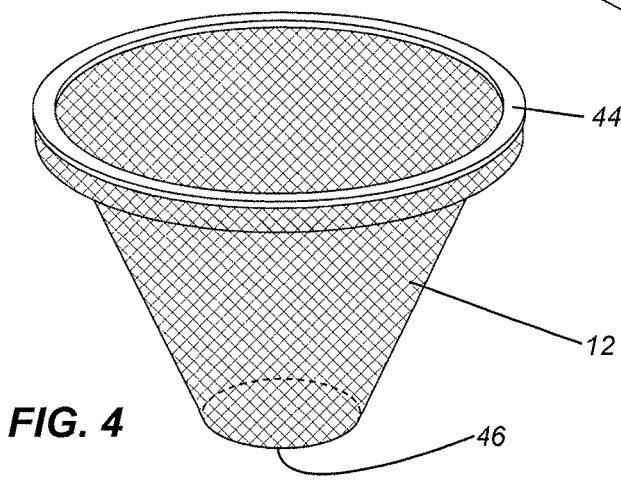
FIG. 4 is a perspective view of a bait trapping member component of a fishing bait holder in accordance with an embodiment of the present invention.

With reference to FIG. 4, in certain embodiments, a bait trapping member 40 may be included for use a part of the fishing bait holder 10. While one primary function of the fishing bait holder 10 is holding fishing bait B, by using the bait trapping member 40, a user may effectively achieve a second, synergistic, primary function, namely trapping bait B, which may then be held. The bait trapping member 40 may be partly or wholly formed by a trap wall 42, which may be porous to facilitate movement of water therethrough, while not allowing bait to pass therethrough. When the bait trapping member 40 is placed over the bait opening 18, the configuration of the trap wall 40 is suitable to allow bait animals to enter the bait holding space 16 while impairing the escape of bait animals from the bait holding space 16. In one configuration, as shown in FIG. 3, the trap wall 42 defines a generally frustoconical space, with a trap opening 46 at the apex of the frustoconical space, suitably sized to allow bait animals, such as minnows, to pass therethrough. When placed over the bait opening 18, the bait trapping member 40 depicted in FIG. 3 is oriented such that the apex of the frustoconical space points into the bait holding space. In the embodiment depicted in FIG. 3, the rim 44 of the bait trapping member 40 is suitably configured for threaded engagement with the outer wall 12 at the bait opening 18.

In use, a user may remove the lid 36, and, optionally, the base cap 32, and/or bait lifter 20, if those parts are currently being used, from the fishing bait holder 10. The user may place the bait trapping member 40 over the bait opening 18, and may secure the bait trapping member 40 in place, for example by threaded engagement of the rim 44 with corresponding threads on the outer wall 12. The user may then immerse the fishing bait holder 10 in a body of water, for example a stream or lake, at a depth that is at least great enough to ensure that a portion of the trap opening 46 is below the water line. The fishing bait holder 10 may be secured in place, for example by use of attachment means 38 to attach the fishing bait holder 10 to a suitable substrate, such as a dock, a boat, or natural structure such as a log or rock. Minnows or other bait animals may then inadvertently enter the bait holding space 16 through the trap opening 46, and be subsequently impaired from leaving the bait holding space 16 due to the configuration of the bait trapping member 40. After some time, the user returns to collect the fishing bait holder 10 and the fresh bait thus trapped within for use in fishing. The bait trapping member 40 may be removed, one or more of the base cap 32, lid 36 and bait lifter 20 may be replaced, holding the trapped bait and some water within the bait holding space 16, and the user may the displace the fishing bait holder 10, and the held bait within, to a desired fishing place. The fishing bait holder 10 may be attached via one or more suction cups, fasteners, adhesives or other attaching means to a hull of a boat or to any other suitable surface. The fishing bait holder 10 may also be used for sportsmen wishing to fish from a hydroplane or float plane, i.e. by standing or sitting on one of the pontoons while the plane is floating on water. The bait holder may be attached to the pontoon or fuselage, for example. The bait holder 10 may also be attached to the side of a personal watercraft or jet-ski, from a kayak or other type of boat.

In another embodiment, an oxygen-releasing puck may be placed below the porous basket to oxygenate the water. In this instance, one or more small pinholes may be provided on the top lid to exhaust the extra gas being produced by the puck. In another embodiment, ice may be added to the water to keep the water cool. For example, in one embodiment, ice and/or an oxygen puck may be placed in space 16 (above the porous bottom but below the scoop). In other embodiments, ice or an oxygen puck may be placed anywhere within the container. In another embodiment, the container may be insulated for winter use.

A bait holder in accordance with further embodiments of the present invention are illustrated in FIGS. 5-18. In general, fishing bait holder 10 includes a container having an outer wall 12 and a porous base plate 14 together defining a bait-holding space inside the container, an upper end of the container defining a bait opening 18 for receiving bait to be held, the base plate 14 comprising one or more holes 15 to allow water to pass through the holes in the base plate while blocking the bait from passing through the holes of the base plate. The holder includes a bait-lifting scoop 20 dimensioned to fit inside the bait holding space of the container, the bait-lifting scoop movable upwards relative to the outer wall to lift the bait within the bait holding space to thereby facilitate access to the bait. The holder may be used alone or shared. For example, the user may remove the rod and scoop and pass this to another fishermen in the boat so that the other fisherman can choose a bait.

Figure 5:
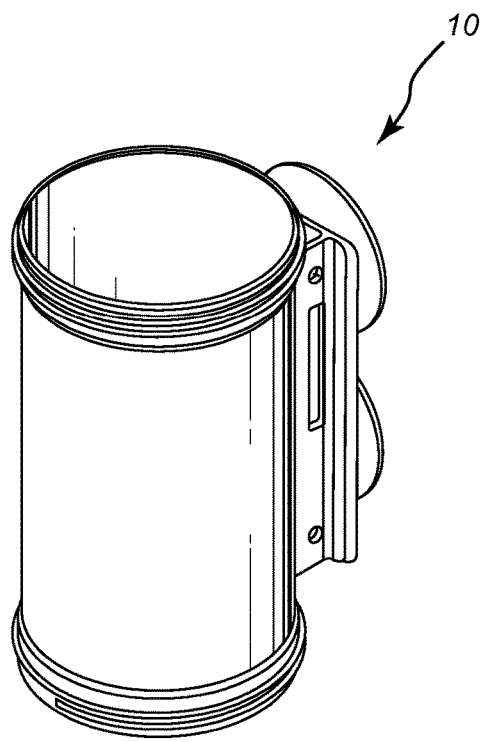
FIG. 5 is a perspective view of a bait holder in accordance with another embodiment of the present invention.
Figure 6:
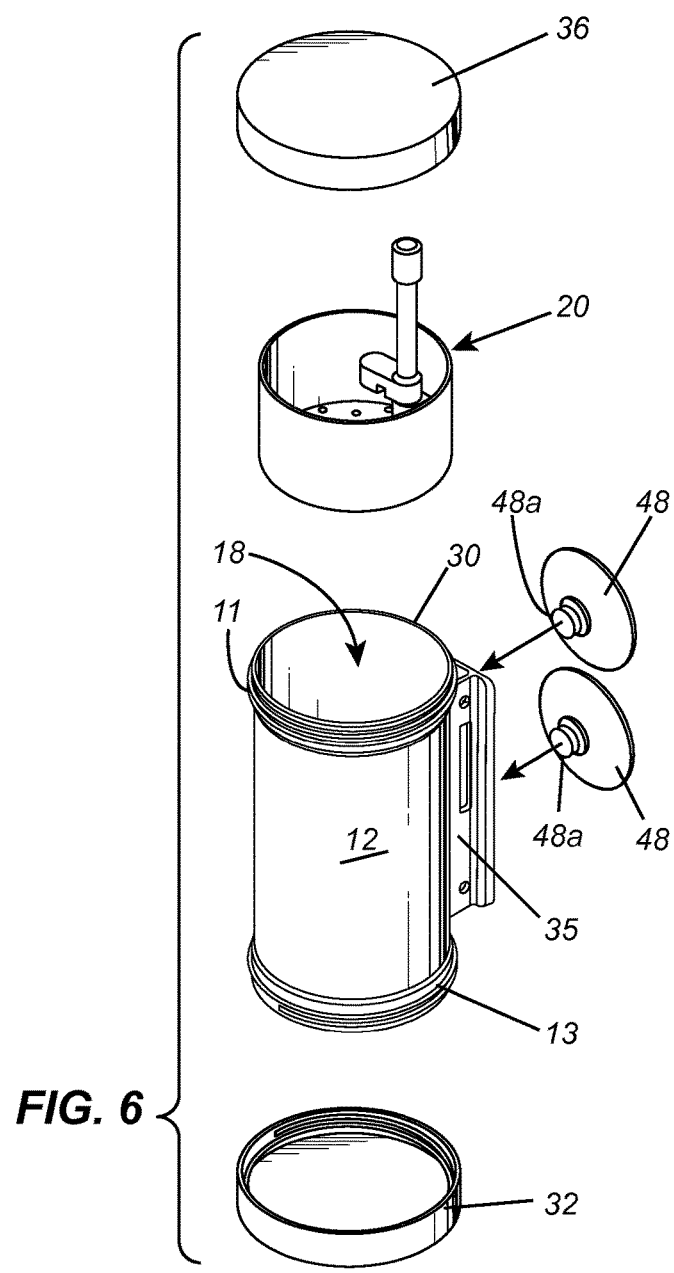
FIG. 6 is an exploded view of the bait holder of FIG. 5.

In the embodiment depicted by way of example in FIGS. 5 and 6, the bait holder 10 includes a container defined by a curved or cylindrical outer container wall 12. The holder thus forms in this embodiment a substantially cylindrically shaped container. The holder 10 includes upper external threads 11 (extending downwardly from the rim 30) and lower external threads 13 (extending upwardly from the bottom of the wall 12). A base 32 (or "base cap") has internal threads that engage the lower external threads 13. A lid 36 (or "lid cap") has internal threads that engage the upper external threads 11 to enclose the holder. When removed, bait may be inserted into the holder via upper opening 18. The holder includes a scoop 20 (or bait lifter) which is disposed inside the internal space defined by the container wall 12. An attachment mechanism 35 is secured to the wall 12 of the holder 10. The attachment mechanism 35 includes an attachment means such as suction cups 48. The suction cups ("mushroom head suction cups"). have nipples 48a that connect to slots in the attachment mechanism 35 as will be elaborated below in greater detail.

Figure 7:
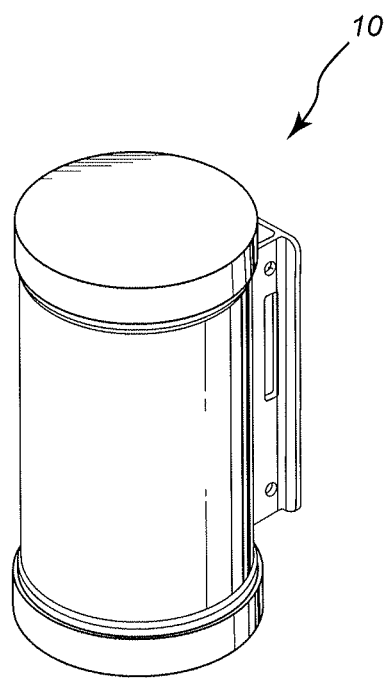
FIG. 7 is a perspective view of a bait holder in accordance with another embodiment of the present invention.
Figure 8:
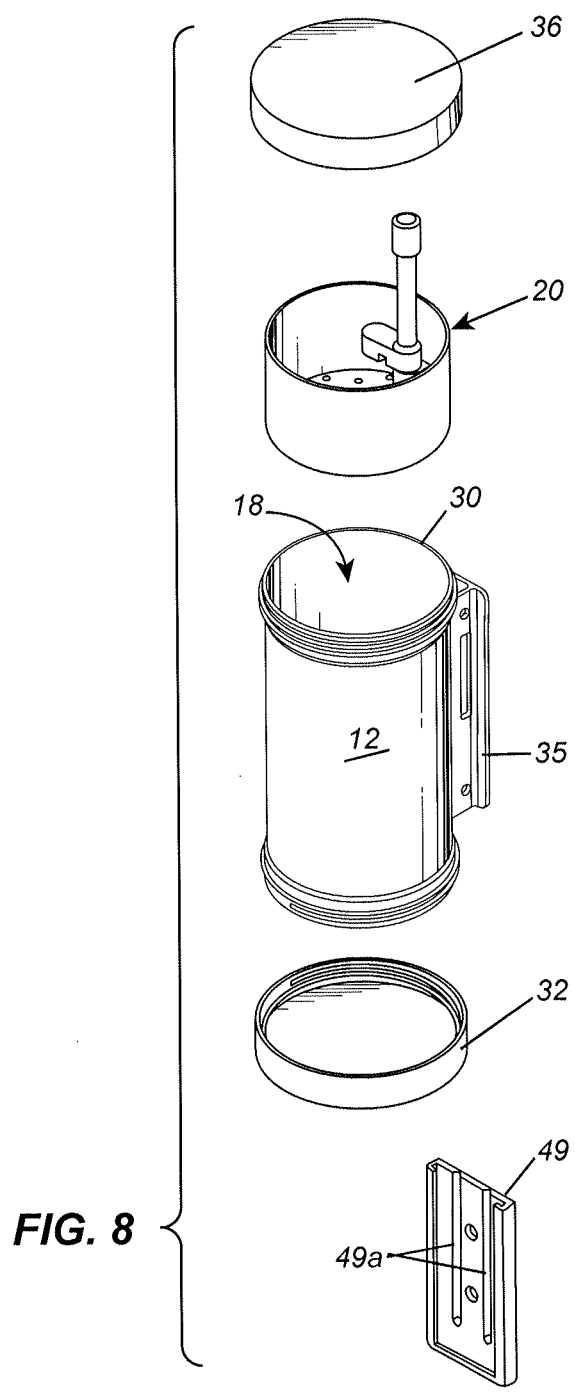
FIG. 8 is an exploded view of the bait holder of FIG. 7.

In the embodiment depicted by way of example in FIGS. 7 and 8, the attachment mechanism 35 of the bait holder 10 slides onto a rail mount 49 that may be secured by two fasteners to a boat structure or other object. The rail mount 49 includes two parallel slots 49a for receiving rails.

Figure 9:
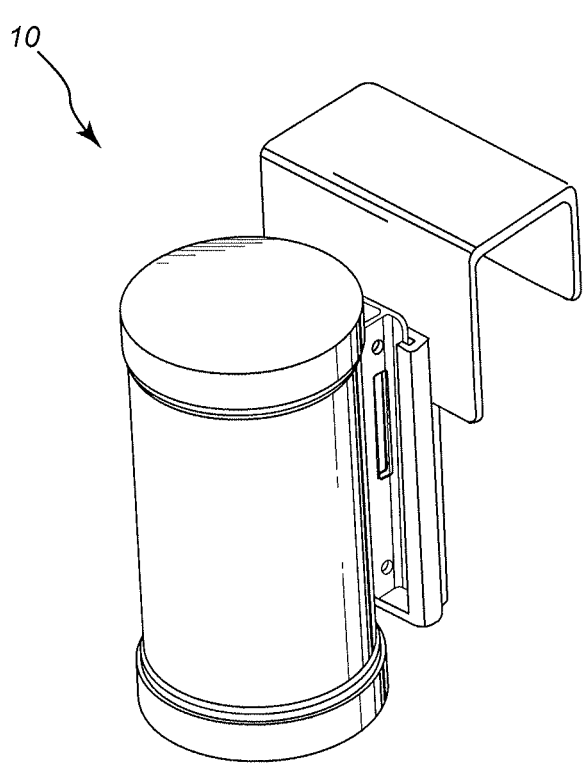
FIG. 9 is a perspective view of a bait holder in accordance with another embodiment of the present invention.
Figure 10:
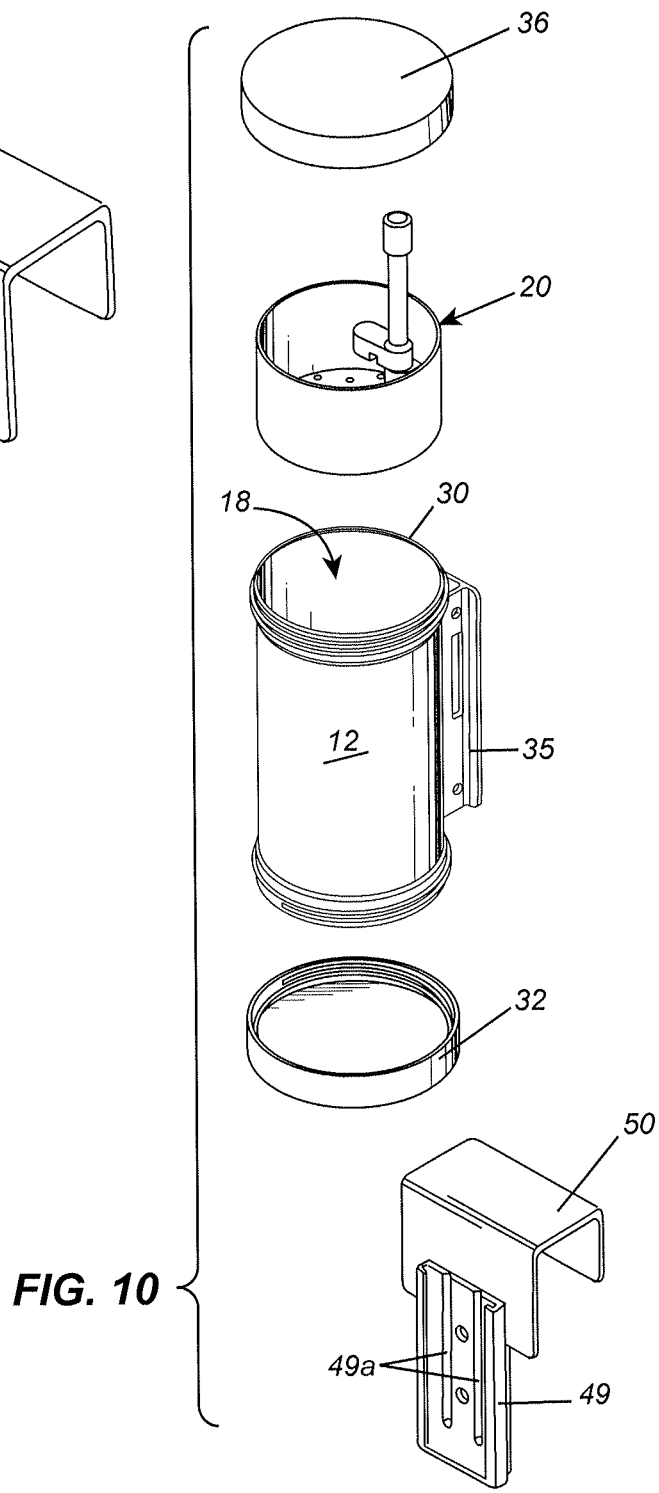
FIG. 10 is an exploded view of the bait holder of FIG. 9.
Figure 11:
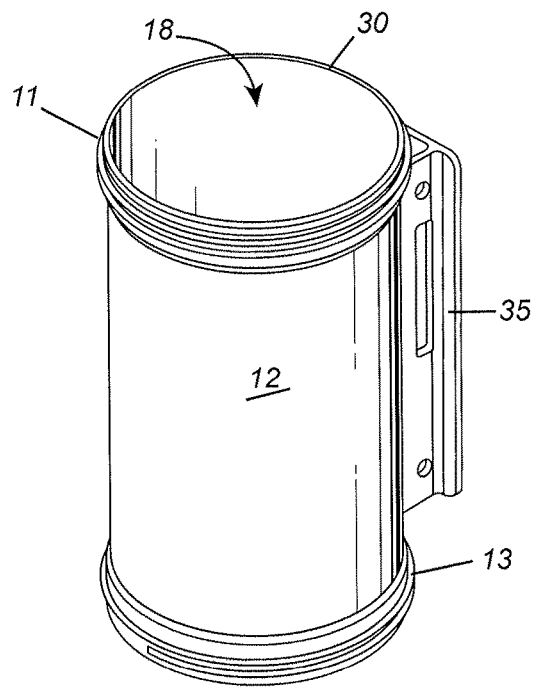
FIG. 11 is a perspective view of a container of the bait holder.
Figure 12:
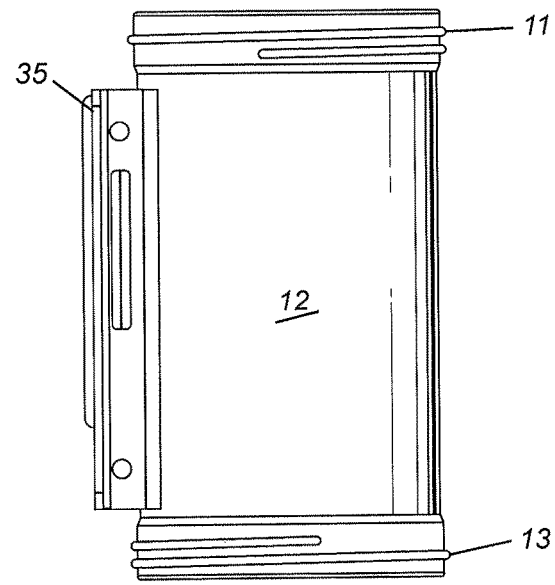
FIG. 12 is a side view of the bait holder of FIG. 11.

In the embodiment depicted by way of example in FIGS. 9 and 10, the bait holder 10 includes a boat mount bracket 50 that connects to the rail mount 49.

Figure 13:
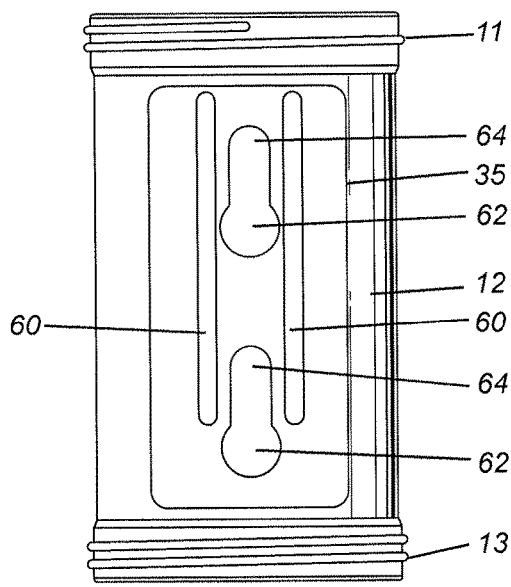
FIG. 13 is a front view of the bait holder of FIG. 11.

FIGS. 11-14 present perspective, side, front and bottom views of a container of the bait holder 10 in accordance with one particular embodiment. In the embodiment depicted in FIGS. 11 and 12, the lid 36 and the base 32 may be the same cap. In the front view of FIG. 13, the attachment mechanism 35 includes two parallel rails 60 for sliding in the slots 49a shown in FIG. 8 and FIG. 10. FIG. 13 also depicts the suction cup receptacles 62 and grooves 64 (i.e. key hole slots) into which the nipples 48a of the suction cups 48 are inserted and slid.

Figure 14:
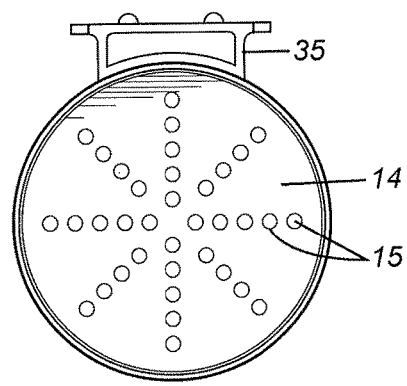
FIG. 14 is a bottom view of the bait holder of FIG. 11.

In the bottom view of FIG. 14, there is a strainer plate 14 that includes a plurality of holes or apertures 15. The holes or apertures 15 may be disposed in a star-shaped layout, as shown by way of example, or they may configured in any other arrangement. The number of holes may also be varied. The diameter of the holes may be varied provided they are small enough to retain the smallest bait.

Figure 15:
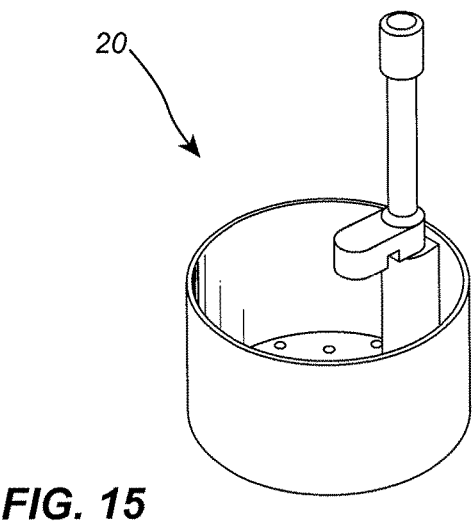
FIG. 15 is a perspective view of a scoop.
Figure 16:
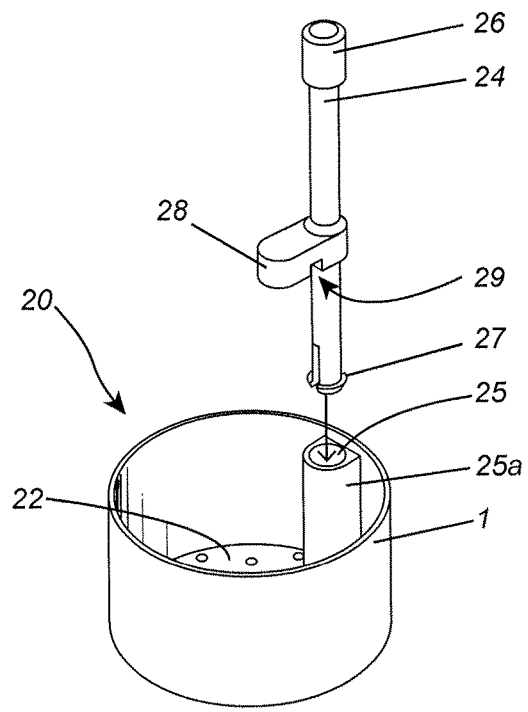
FIG. 16 is an exploded view of the scoop of FIG. 15.

FIGS. 15 and 16 present perspective and exploded views of a scoop 20 (or "bait lifter") in accordance with one particular embodiment. In the embodiment depicted by way of example in FIGS. 15 and 16, the scoop 20 includes a strainer plate 22 having holes through which water flows while retaining the bait inside the scoop. The scoop includes a rotating rod 24 and an upper knob 26. The rotating rod fits into a bore 25 of a socket 25a. An arm 28 is connected to the rod. The arm has a notch 29 (or slit or groove) in an underside of the arm. The rod and arm may be rotated to hook the notch of the arm onto the rim 30 of the holder. The bottom of the rod may have a flared, bulbous, widened or arrow-shaped nose 27 to be inserted axially downwardly through the bore and to lock the rod axially relative to the socket so that lifting the rod causes the entire scoop to lift.

Figure 17:
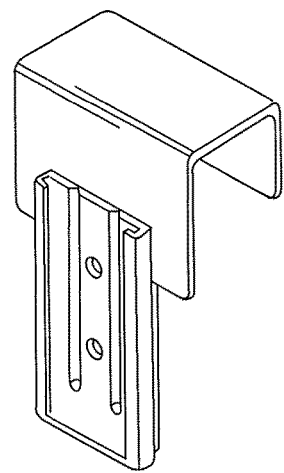
FIG. 17 is a perspective of a boat mount bracket assembly.
Figure 18:
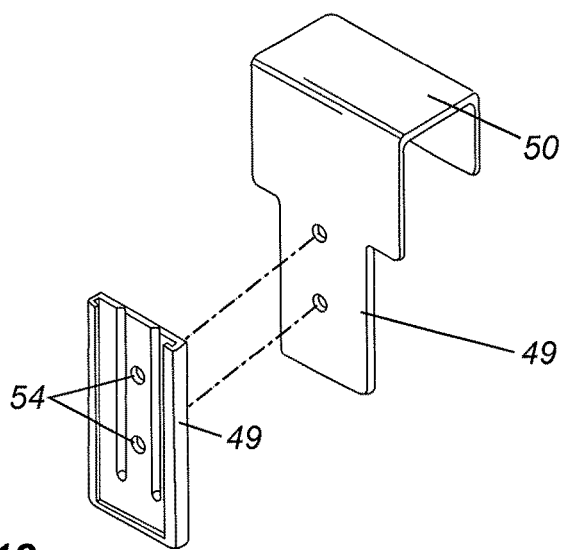
FIG. 18 is an exploded view of the boat mount bracket assembly of FIG. 17.

FIGS. 17 and 18 present perspective and exploded views of a boat mount bracket assembly in accordance with one particular embodiment. The boat mount bracket 50 has two holes 52 that align with holes 54 in the rail mount 49. These holes may be used to fasten the boat mount bracket to the rail mount, i.e. the holes on the rail mount and the bracket are for screws, nuts and bolts or any other suitable type of fasteners. The boat mount bracket has a channel-shaped section to fit over the side of the typically sized hull of a small boat or watercraft. The holder may also be mounted on to a pair of spaced-part screws or anchors that are inserted into a generally vertical surface, e.g. a wood plank, board, wall or other such component.

Other attachment mechanisms include, for example, two-way tape or adhesive on the rail mount, Velcro, clips, snaps, or other connectors or fasteners on the rail mount. The holder may also have a belt slit or a belt clip. A belt slit is specifically designed to fit on a belt. Alternatively, a belt clip having two holes is able to hold the rail mount. In each case, the user can carry the holder hands-free. The holder may also be placed unsecured on a flat surface or inserted into a drink holder.

In other embodiments, the bottom cap may incorporate an aerating mechanism for aerating the water in the holder. Similarly, the top cap may optionally contain a venting mechanism. These mechanisms may be manually operated or battery-powered. Each of the caps may have a string, cord, chain or equivalent to keep the caps loosely connected to the holder, i.e. to prevent the caps from being lost or from falling into the water.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed in this specification. The scope of the exclusive right sought by the applicant is therefore intended to be limited solely by the appended claims.

The invention claimed is:

1. A fishing bait holder comprising:
   a container having an outer wall and a porous base plate together defining a bait-holding space inside the container, an upper end of the container defining a bait opening for receiving bait to be held, the base plate comprising one or more holes to allow water to pass through the one or more holes in the base plate while blocking the bait from passing through the one or more holes in the base plate;
   a bait-lifting scoop dimensioned to fit inside the bait-holding space of the container, the bait-lifting scoop movable upwards relative to the outer wall to lift the bait within the bait-holding space to thereby facilitate access to the bait wherein the scoop comprises a rotatable rod attached thereto to facilitate lifting of the scoop, wherein the rotatable rod is rotatable about a longitudinal axis of the rotatable rod relative to the scoop;
   an arm connected orthogonally to the rotatable rod and having an underside notch for resting the scoop in an elevated position by rotating the arm and hooking the notch on a rim of the outer wall; and
   a solid base cap for covering the base plate.

2. The fishing bait holder of claim 1 wherein the bait-lifting scoop comprises one or more holes to allow water to pass through the one or more holes of the scoop while blocking the bait from passing through the one or more holes of the scoop.

3. The fishing bait holder of claim 2 wherein the scoop is dimensioned to fit within the bait-holding space of the container such that the bait cannot pass between the scoop and the outer wall.

4. The fishing bait holder of claim 1 wherein the base cap is threaded to engage lower threads on the outer wall.

5. The fishing bait holder of claim 1 further comprising a lid cap for covering the bait opening.

6. The fishing bait holder of claim 5 wherein the lid cap is threaded to engage upper threads on the outer wall.

7. The fishing bait holder of claim 1 further comprising an attachment mechanism for detachably mounting the fishing bait holder.

8. The fishing bait holder of claim 7 wherein the attachment mechanism comprises one or more suction cups.

9. The fishing bait holder of claim 7 wherein the attachment mechanism comprises rails for engaging slots in a rail mount.

* * * * *